No. 760,158. PATENTED MAY 17, 1904.
C. P. E. SCHNEIDER.
CARRIER OR CONVEYER FOR PROJECTILES OR OTHER LOADS.
APPLICATION FILED JUNE 13, 1903.
NO MODEL. 10 SHEETS—SHEET 1.

No. 760,158. PATENTED MAY 17, 1904.
C. P. E. SCHNEIDER.
CARRIER OR CONVEYER FOR PROJECTILES OR OTHER LOADS.
APPLICATION FILED JUNE 13, 1903.
NO MODEL. 10 SHEETS—SHEET 2.

No. 760,158. PATENTED MAY 17, 1904.
C. P. E. SCHNEIDER.
CARRIER OR CONVEYER FOR PROJECTILES OR OTHER LOADS.
APPLICATION FILED JUNE 13, 1903.
NO MODEL. 10 SHEETS—SHEET 3.

No. 760,158. PATENTED MAY 17, 1904.
C. P. E. SCHNEIDER.
CARRIER OR CONVEYER FOR PROJECTILES OR OTHER LOADS.
APPLICATION FILED JUNE 13, 1903.
NO MODEL. 10 SHEETS—SHEET 6.

No. 760,158. PATENTED MAY 17, 1904.
C. P. E. SCHNEIDER.
CARRIER OR CONVEYER FOR PROJECTILES OR OTHER LOADS.
APPLICATION FILED JUNE 13, 1903.
NO MODEL. 10 SHEETS—SHEET 7.

No. 760,158. PATENTED MAY 17, 1904.
C. P. E. SCHNEIDER.
CARRIER OR CONVEYER FOR PROJECTILES OR OTHER LOADS.
APPLICATION FILED JUNE 13, 1903.
NO MODEL. 10 SHEETS—SHEET 8.

No. 760,158. PATENTED MAY 17, 1904.
C. P. E. SCHNEIDER.
CARRIER OR CONVEYER FOR PROJECTILES OR OTHER LOADS.
APPLICATION FILED JUNE 13, 1903.
NO MODEL. 10 SHEETS—SHEET 10.

No. 760,158. Patented May 17, 1904.

UNITED STATES PATENT OFFICE.

CHARLES PROSPER EUGÈNE SCHNEIDER, OF LE CREUSOT, FRANCE.

CARRIER OR CONVEYER FOR PROJECTILES OR OTHER LOADS.

SPECIFICATION forming part of Letters Patent No. 760,158, dated May 17, 1904.

Application filed June 13, 1903. Serial No. 161,360. (No model.)

*To all whom it may concern:*

Be it known that I, CHARLES PROSPER EUGÈNE SCHNEIDER, iron-master, of Le Creusot, Saône-et-Loire, in the Republic of France, have invented an Improved Carrier or Conveyer for Projectiles or other Loads; and I do hereby declare the following to be a full, clear, and exact description of the invention, such as will enable others skilled in the art to which it appertains to make and use the same.

This invention has for its object an appliance or carrier which enables a load to be conveyed horizontally a short distance over an obstacle or gap which for any reason it is not desirable to provide with a conveyer traveling either upon the ground or upon a suspended track—for example, the charging-aperture of a smelting or heating furnace, the recoil-space at the breech of a gun, &c. The end which it is desired to attain is the transfer of a load in a direct line by means of an appliance that is mounted upon a single support or foundation of limited extent and is capable of exact and rapid maneuvering by manual effort.

I have devised a beam-conveyer having a rectilinear movement which fulfils these conditions.

The appliance is illustrated in detail in the accompanying drawings, in which—

Figures 1 to 3 are diagrams illustrating the principle of the appliance. Figs. 4 to 25 represent various practical forms of the appliance.

Figure 1:
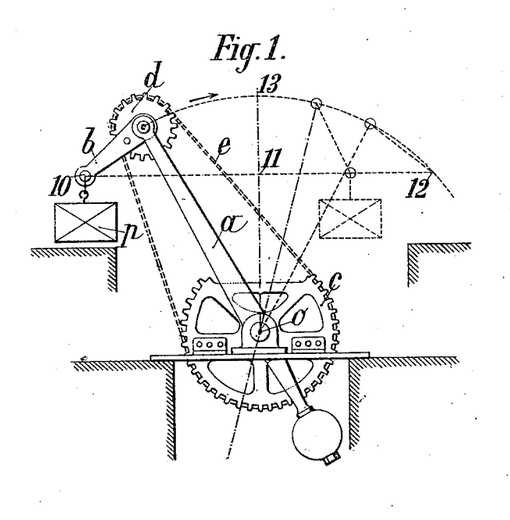
Fig. 1 is a diagram showing the whole of the constituent parts of the appliance.

The appliance consists in principle of the following parts:

First. A beam $a$, one extremity of which rocks upon a fixed shaft $o$. If necessary for facilitating its operation, this beam may be balanced.

Second. A crank $b$, articulated to the other extremity of the beam and turning in the same direction as that in which the latter rocks. The pin 10 of the crank serves for the attachment of the load $p$ to be transported or of its support.

Third. Transmission mechanism of a kind suitable for the various constructional forms, comprising, for example, a fixed toothed wheel or segment $c$, a pinion $d$, rigid with the crank, and an endless chain $e$. This mechanism transmits in the desired direction the rocking or oscillatory movement of the beam to the crank.

Figure 2:
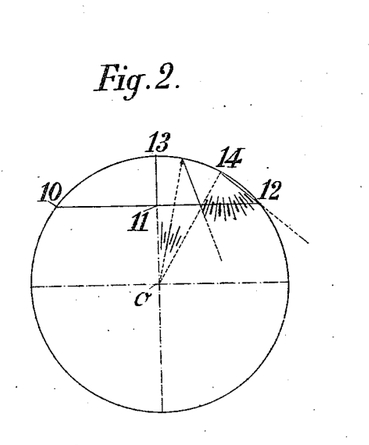
Fig. 2 relates to the geometrical explanation of the best ratios to establish between the proportion of the parts and the velocity of the movements.
Figure 3:
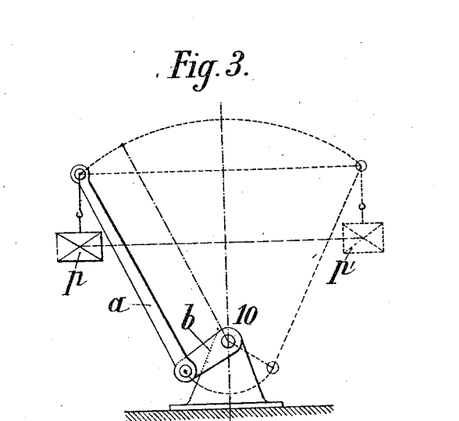
Fig. 3 is a diagram which represents another form embodying the principle of the appliance.
Figure 4:
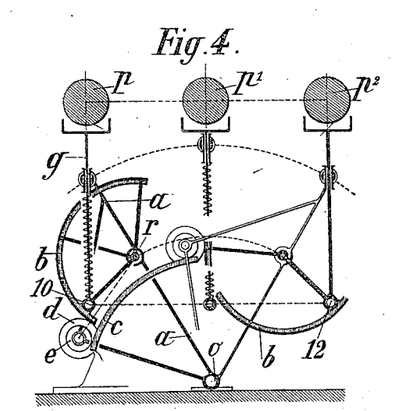
Fig. 4 is a diagram which represents the nature and direction of the movements.
Figure 5:
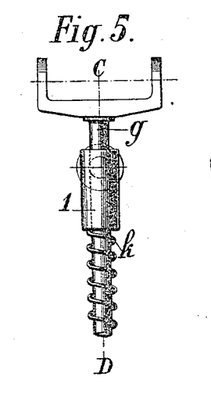
Fig. 5 is a detailed view showing the attachment of the load-support in elevation.
Figure 6:
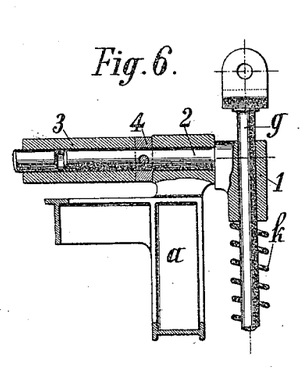
Fig. 6 is a vertical section on the line C D of Fig. 5.
Figures 7, 8:
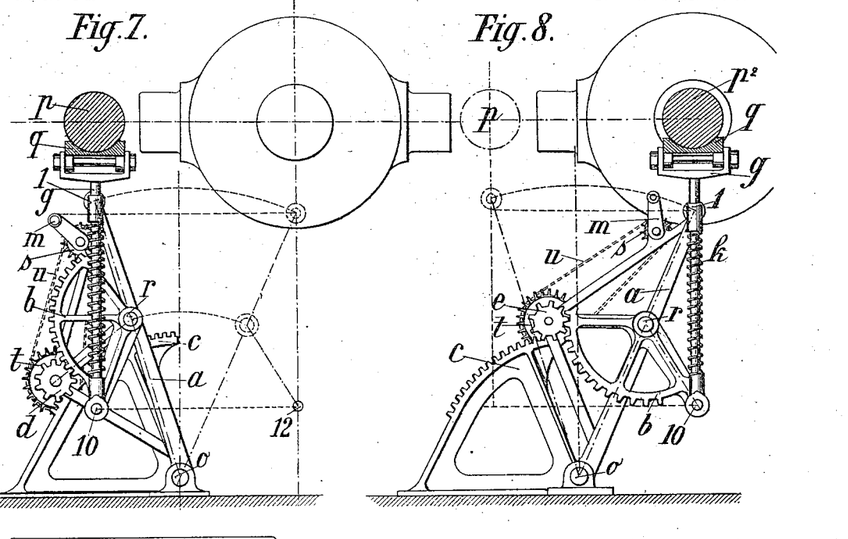
Fig. 7 represents the appliance as a whole as seen from the side on which the base of the projectile is situated and before the transport movement has been effected.
Fig. 8 is a similar general view after the transport has been effected.
Figure 9:
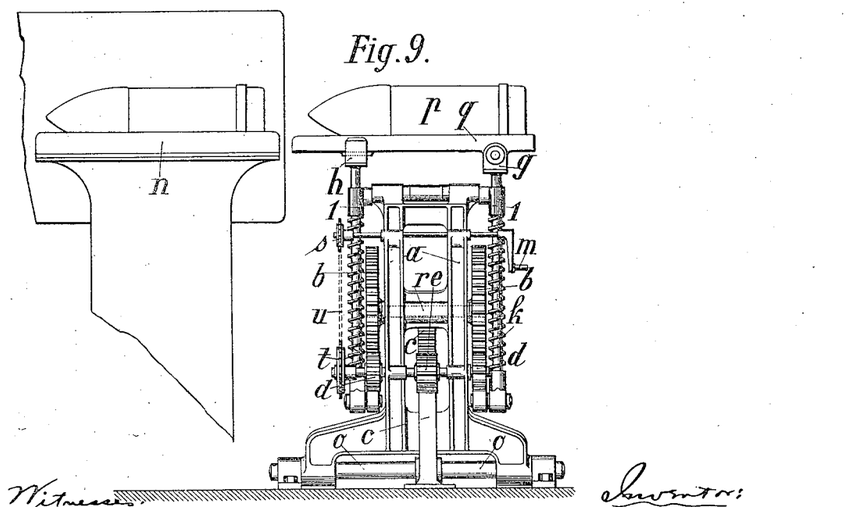
Fig. 9 is a side elevation corresponding to Fig. 7.
Figure 10:
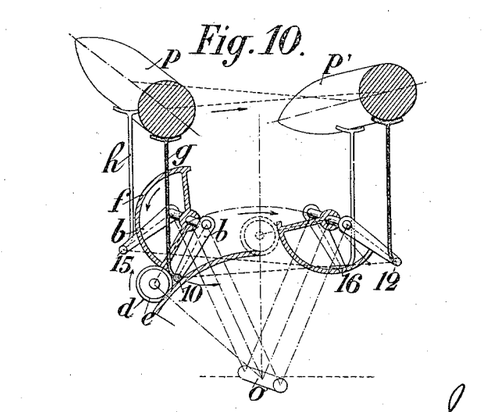
Fig. 10 is a diagram which represents the position and operation of the moving parts.
Figure 11:
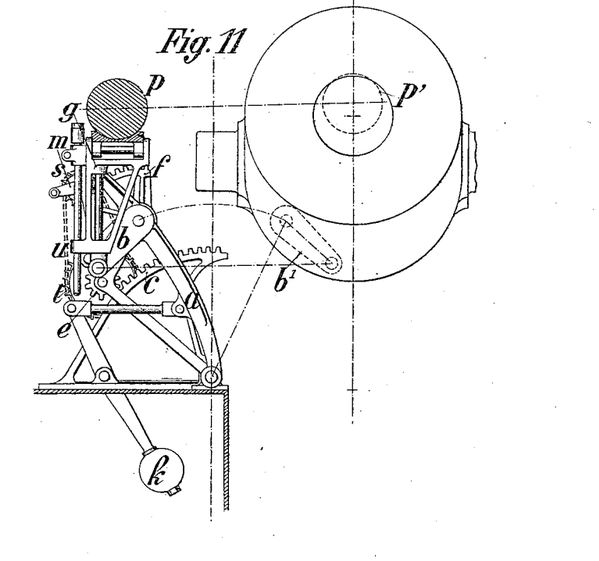
Fig. 11 is an elevation of the appliance as a whole as viewed from the side upon which the base of a projectile is situated and before transport has been effected.
Figure 12:
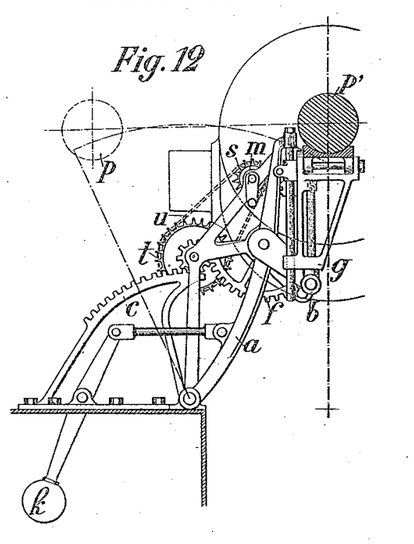
Fig. 12 is a similar view after transport has been effected.
Figure 13:
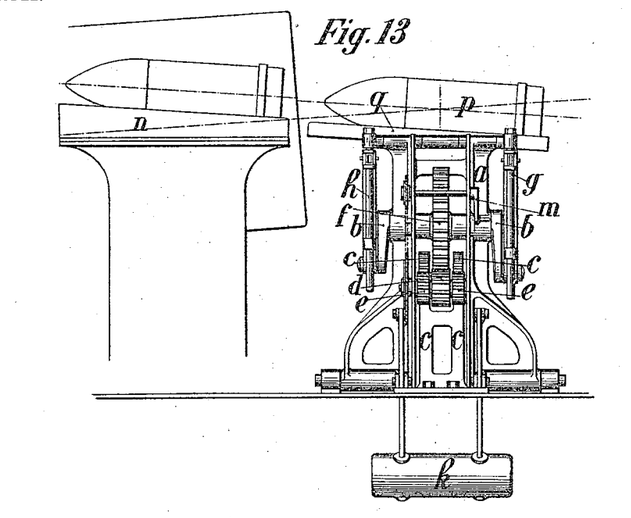
Fig. 13 is a side elevation corresponding to Fig. 11.
Figures 14, 17:
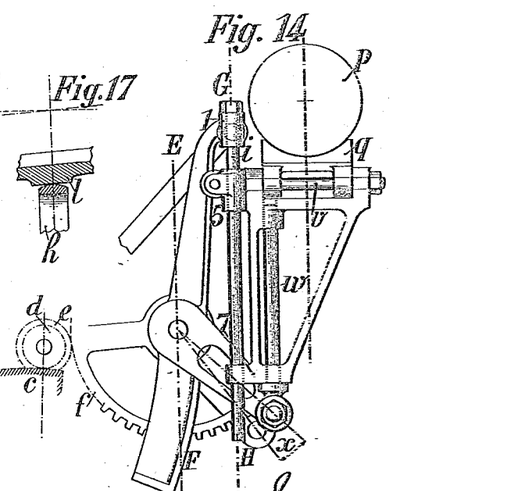
Fig. 14 represents the upper part of the appliance as a whole seen from the side upon which the base of the projectile is situated and in the position illustrated in Fig. 12.
Fig. 17 is a partial vertical section on the line O P of Fig. 16.
Figure 15:
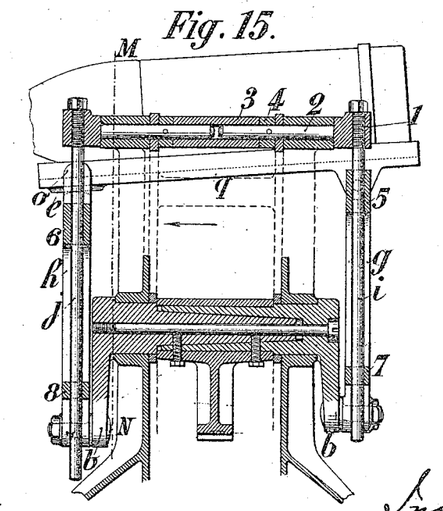
Fig. 15 is a sectional elevation, half of which is on the line E F and half on the line G H of Fig. 14. In order to facilitate the reading of the figure, the portions omitted are indicated by dotted lines.
Figure 16:
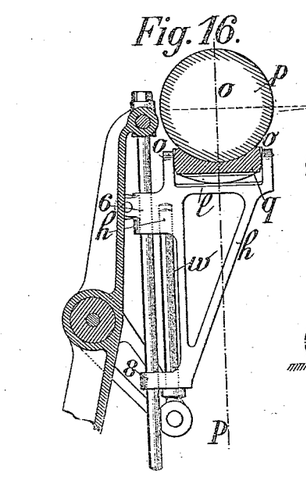
Fig. 16 is a section on the line M N of Fig. 15 as seen in the direction indicated by the arrow.

The velocity of the movements of rotation and the length of the beam and of the crank are such as to cause the crank-pin to describe a path 10 11 12, which transforms into as straight a line as possible the arc of the circle 10 13 12 described by the outer extremity of the beam. This path is almost the same as the chord 10 12 of Fig. 2 when the radius of the crank is equal to the versed sine 13 11 of arc 10 13 12 described by the beam when the velocities of the movement of rotation are as the ratio of the two angles 13 0 14 and 12 14 0, which are formed one by the radius perpendicular to the chord with the center line of the beam, the other by the center line of the beam with the adjacent position of the versed sine supported simultaneously by its extremities upon the chord and upon the arc. In the limits of any desired chord and in all the positions which the radius and the versed sine are able to assume under these conditions the ratio between these angles remains practically constant. The arrangement may obviously be carried out by inverting the functions of the crank and the beam—that is to say, by causing the pin 10 of the crank $b$ to rock upon the fixed point, as shown in Fig. 3. In this case the straight path is described by the free extremity of the beam.

Figs. 4 to 9 represent one constructional form of the appliance intended for the transport of heavy projectiles for facilitating the loading of guns. The employment of this constructional form presupposes the existence of a projectile-receptacle arranged at the side of the gun and at a level with its loading position, which we will assume to be horizontal. The operation to be effected consists in bringing the projectile opposite to the breech-chamber and in transporting it horizontally and parallel with its axis.

The difficulty in the construction and arrangement of the appliance arises from the necessity of not obstructing the passage of the gun during its recoil movement.

The appliance as a whole may be considered as comprising two identical conveyers so connected together as to act in parallel planes, one transporting the front of the projectile and the other its rear.

The beam $a$, which rocks at $o$, consists of a framework having the form of an inverted T, the vertical member of which is strengthened by two triangular frames. The function of the crank is fulfilled by a pair of toothed sectors $b$, provided with pins 10 and keyed upon a shaft $r$, which rotates in a sleeve forming part of a stay between the triangular frames of the beam. The transmission mechanism, which transmits the rotary movement of the crank $m$ to the beam, is composed of a fixed toothed arc $c$, a central pinion $e$, which travels upon this arc, Fig. 9, and a pair of pinions $d$, which engage with the toothed crank-sectors $b$. These three pinions $e\ d\ d$ are keyed upon the same shaft. The pin 10 of each crank-sector describes an almost rectilinear path passing through 10 12, Figs. 4 and 7.

The projectile $p$ to be transported rests upon a support $q$ of cradle shape, mounted upon two similar forked connecting-rods $g$ and $h$, the lower ends of which are articulated to the pins of the crank-sectors. The upper portion of each of these connecting-rods loosely engages with a socket 1, articulated to the head of the beam by means of a lateral stem 2, entering a sleeve 3 and having a stop-washer 4. Owing to the movements of the beam and the crank-sectors, these connecting-rods $g$ and $h$ are displaced parallel to each other in sliding in the sockets 1, their length remaining the same. The axis of the projectile is also displaced parallel with itself and in a plane parallel with 10 12, Figs. 4 and 7. It successively occupies the position $p'$ and $p^2$. The movement is imparted to the beam by hand by means of the crank $m$, which imparts rotation to the shaft of the pinions $e$ and $d$ through the intervention of two other pinions $s$ and $t$, connected together by an endless chain $u$. The vertical reaction resulting from the weight of the beam is balanced during the movement by the upward thrust exerted on the sockets 1 by the alternate extension and compression of the springs $k$, surrounding the forked connecting-rods. The projectile $p$ is slid from the projectile-receptacle $n$ onto the support $q$. This support may comprise the special device (charging slide or carriage) employed for introducing the projectile into the breech-chamber of the gun.

Figs. 10 to 17 represent a second constructional form of the appliance in which the loading and unloading thereof are effected at inverse inclinations arranged in a direction favorable to the execution of these operations, the support for the projectile automatically arranging itself at the desired inclination. This second form of the appliance also permits of bringing opposite to the breech-chamber of the gun projectiles taken from a receptacle situated at the side of the gun, but at a different inclination thereto.

The constituent parts of the appliance are the beam $a$, balanced by the articulated counterweight $k$, the two rigidly-connected cranks $b$, upon the pins of which rotate the lower ends of the uprights $g$ and $h$, which support the projectile to be transported, the transmission mechanism, consisting of a fixed arc $c$, having a double set of teeth, and two pinions $e$, which travel upon this arc, carrying with them the central pinion $d$, which operates the toothed sector $f$, keyed upon the crank-shaft. The two cranks act together, but are set at a slight angle $x$ with respect to each other, Fig. 14, whereby the pins 10 and 15, Fig. 10, describe paths 10 12 and 15 16, inclined in inverse directions. The uprights $g$ and $h$ follow the same movement while remaining practically vertical. Owing to this, one of the extremities of the projectile rises while the other descends. These uprights $g$ and $h$ (represented in detail in Figs. 14, 15, and 16) are articulated to the projectile-support $q$ by the following secondary parts: two similar rods $i$ $j$, each fixed by a screw-threaded portion to the socket 1, which rotates at 2 in the head of the beam. These sockets are guided and retained by a sleeve 3 and a stop-washer 4. The rods $i$ and $j$ slide freely in the projections 5, 6, 7, and 8 of the uprights $g$ and $h$. The projection 5 has a stem $v$, Fig. 14, upon which the rear of the projectile-support rocks. By reason of the angle $x$ between the two cranks the uprights $g$ and $h$ do not remain absolutely parallel while the transport is being effected. Therefore in order to avoid the strain which would result from the torsional movement the lower front portion of the support $q$ where it rests upon the upper cross-piece of the front upright $h$ is curved at $l$, Fig. 17, which permits it to slide and rock simultaneously in all directions upon said cross-piece between the flanges $o$. In addition the two uprights $g$ and $h$ are able to turn freely in a vertical direction by reason of the rods $w$ being articulated to the crank-pins—that is to say, the connection of the support $q$ to the uprights $g$ and $h$ has no rigidity either vertically or horizontally. As in the first constructional form of the appliance described, movement is imparted to the beam by hand by means of a crank $m$, which acts upon the shaft of the pinions $d$ and $e$ by the intermediary of an endless chain $u$, connecting two toothed pinions $s$ and $t$. The projectile is slid from the receptacle $n$ onto the support $q$.

Figure 18:
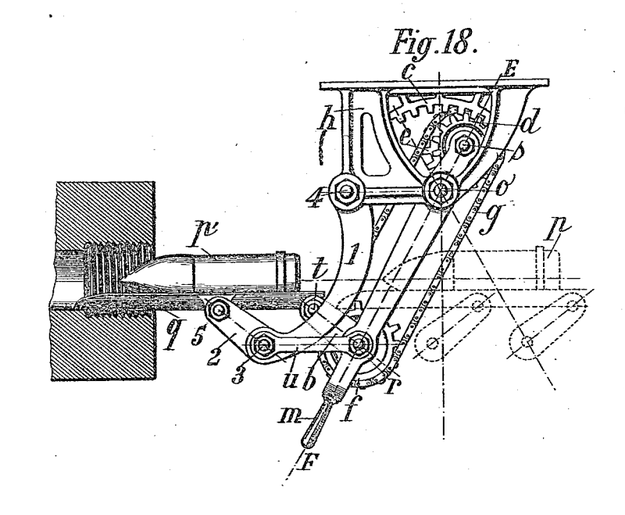
Fig. 18 represents in elevation the appliance as a whole in the position which it occupies after transport has been effected.
Figure 19:
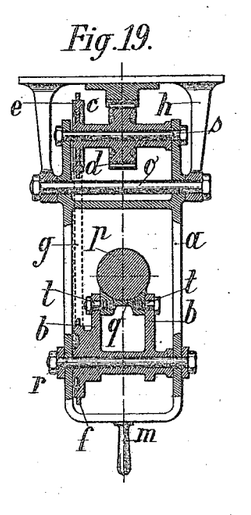
Fig. 19 is a section on the line E F of Fig. 18, the appliance being assumed to have stopped midway of its travel—that is to say, when the projectile occupies the position indicated in dotted lines in Fig. 18.

Figs. 18 and 19 illustrate a third constructional form of the appliance, in which the loading and unloading of the support $q$ are effected in the direction of the transport. The bearing for the appliance is suspended. This form is applicable to the direct introduction of the projectile into the breech-chamber of guns mounted in casemates, the projectiles being taken from the rear at a point out of the reach of the gun in recoil.

The beam comprises a frame $a$, rocking upon a shaft $o$, mounted in a bracket $h$, which is assumed to be fixed to an arm moving over the roof of the casemate concentrically with the pivot of the gun-carriage. The crank $b$ rotates upon the beam at $r$. It has a wide recess that divides it into two arms, between which is articulated the rear of the support $q$ by means of two bolts $t$, which act as pivots. The front portion of this support is supported at 5 in the same manner by a second crank 2, similar to the crank $b$ and mounted at 3 upon an auxiliary beam 1, which rocks at 4. The two beams $a$ and 1, which are of the same length, are connected by cross-pieces $u$. The system as a whole constitutes two articulated parallelograms 4 $o$ $r$ 3 and $r$ 3 $t$ 5. The transmission mechanism connecting the beams with the cranks is composed of the fixed toothed sector $c$, the pinion $d$, gearing with this sector, and the pinions $e$ and $f$, connected together by the endless chain $g$. Movement is given by hand by means of the handle $m$. The auxiliary beam 1 is curved in order to free the rear of the projectile. The position of the projectile before transport is represented in dotted lines.

Figure 20:
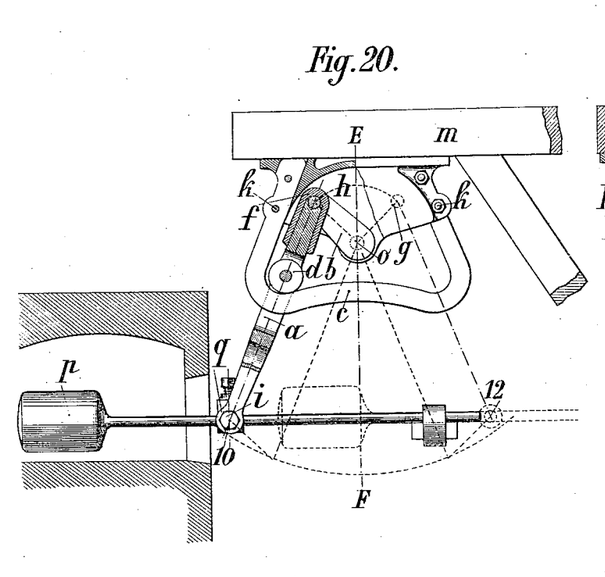
Fig. 20 is a sectional elevation showing the appliance as a whole, one half being in elevation and the other half in section on the line C D of Fig. 21.
Figure 21:
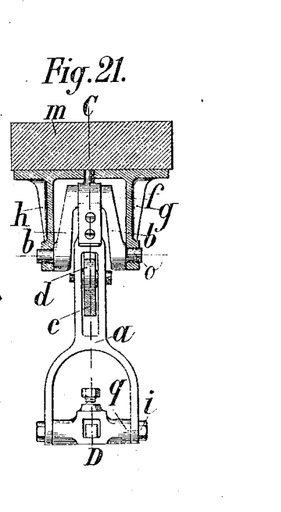
Fig. 21 is a section on the line E F of Fig. 20, the appliance being assumed to have reached the middle of its travel.
Figure 22:
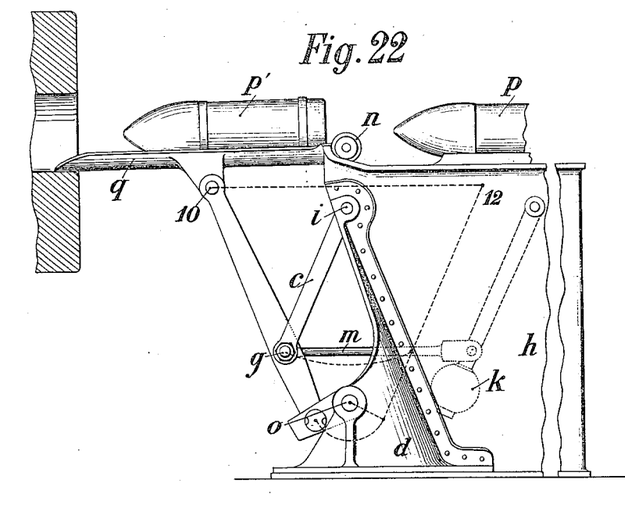
Fig. 22 shows the appliance as a whole in elevation.
Figure 23:
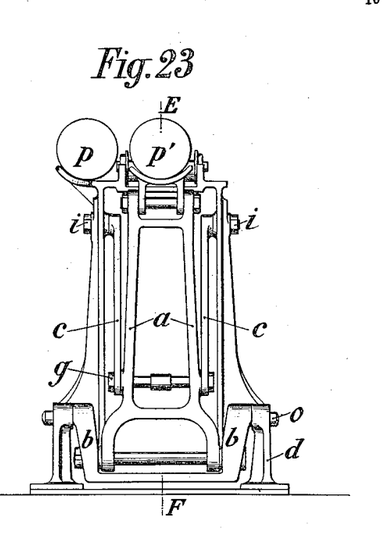
Fig. 23 is an end elevation of Fig. 22.
Figure 24:
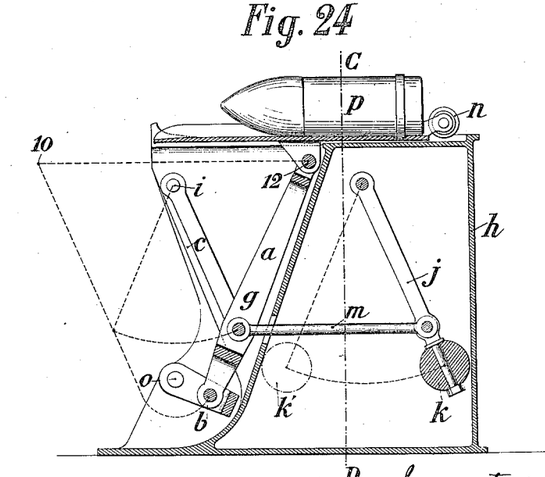
Fig. 24 is a section on the line E F of Fig. 23.
Figure 25:
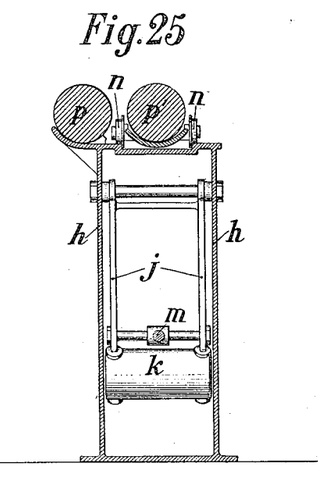
Fig. 25 is a section on the line C D of Fig. 24.

Figs. 20 and 21 represent a fourth constructional form of the appliance characterized by the inversion of the functions of the crank and the beam and by the employment of other transmission means. In this example the appliance is adapted for suspension from the arm of a pivot-crane or other conveyer mechanism, its purpose being to facilitate the manipulation of forgings in the furnaces and upon the anvils.

The beam $a$ has the form of a forked connecting-rod. It is provided with a metal strap $f$ for coupling it with the crank. The crank is formed integrally with a crank-shaft $b$, the journals $o$ of which are carried by two brackets $g$ and $h$, fixed to the crank-arm $m$. The piece $p$ to be transported is mounted upon a cross-piece $q$, articulated to the forked arms of the beam by bolts $i$. The ratio between the movements of the crank and the beam is maintained by a guide $c$, upon which travels a roller $d$, that revolves upon a spindle carried by the beam. The contour of this guide may be determined in such a manner as to cause the point of attachment $q$ of the load to move in a rectilinear horizontal path 10 12. The guide is fixed to the appliance by bolts $k$, which connect the brackets $g$ and $h$ together.

Figs. 22 to 25 represent a fifth form of the appliance, which is a modification of the foregoing. The crank is supported upon the ground instead of being suspended. The connection of the rotary movable members is obtained by means which are different, although based on the same principle. In its application this fifth constructional form is employed for supporting and guiding over a gap or space the front of a movable support serving to transport to the breech-chamber of a gun projectiles taken from a receptacle situated beyond and in rear of the gun in recoil. The rear portion of the said support rolls upon a fixed track which terminates in a forward direction at a point where the movement of the recoil ends.

$a$ is the beam; $b$, the crank, which turns at $o$ in two fixed brackets $d$, affixed to the sides of a caisson $h$, the upper part of which serves as a track for the rear rollers $n$ of the support $q$, whereon the projectile $p$ to be transported is arranged. The ratio between the movements of the crank and the beam is maintained by means of two equal connecting-rods $c$, the points of articulation of which are determined in such a manner as to cause $g$ to describe the arc of a circle the curvature of which resembles that of the guide $c$ of the fourth constructional form, Figs. 20 and 21. The head of the beam, which is articulated to the front of the support $q$, describes an almost straight path 10 12. The movement of translation is given by hand by pushing the support $q$ or the base of the projectile it carries. The reactions of the beam and crank are balanced by means of a rocking counterpoise $k$, connected to the beam by the rod $m$.

What I claim, and desire to secure by Letters Patent of the United States, is—

1. In an apparatus of the character described, the combination of a beam or lever and a crank-arm articulated together and one of which is pivoted on a suitable support, a load-support articulated to the other, and means shifting said beam and crank-arm around their respective axes and maintaining the load-support in a substantially horizontal plane.

2. In an apparatus of the character described, the combination of a beam or lever turning on a suitable axis, a crank-arm swinging with and upon said beam or lever, a load-support on said arm, and means simultaneously moving said beam and crank-arm relative to a fixed point in the same direction on their respective axes.

3. In an apparatus of the character described, the combination of a beam fulcrumed on a suitable support, a crank-arm pivoted to said beam, a load-support on said arm, means for swinging the beam on its fulcrum and operative connections between said means and the crank-arm whereby the latter is swung on its pivot as the beam moves on its fulcrum and in the same direction, relative to a fixed point.

4. In an apparatus of the character described, the combination of a beam or lever, a bearing or axis therefor, a crank-arm pivoted thereto, a load-support articulated to said arm, means turning said beam on its axis, and gearing connected to said means, whereby the beam is swung on its axis and the arm is simultaneously swung on the beam, thereby translating the load-support in a substantially horizontal plane.

5. In an apparatus of the character described, the combination of a beam or lever, a bearing or axis therefor, two crank-arms pivoted to said beam or lever, a load-support carried by said arms, and means simultaneously swinging the beam or lever on its axis and the crank-arms on their pivots.

6. In an apparatus of the character described, a rocking beam, a crank-arm articulated thereto, a load-support on the crank-arm, and shifting means operatively connected to said beam and crank-arm, whereby the beam is rocked and the crank-arm is swung relative to the beam.

7. In an apparatus of the character described, a rocking beam, two crank-arms pivoted thereto in the same axial line but at an angle to each other, a load-support articulated to said crank-arms, and shifting means operatively connected to said beam and crank-arms.

8. In an apparatus of the character described, the combination of a rocking beam, a crank-arm pivoted thereon, load-supporting means articulated to said crank-arm, a sliding engagement between said means and the rocking beam, and shifting devices operatively connected to the rocking beam and crank-arm.

9. In an apparatus of the character described, the combination of a rocking beam, a pair of crank-arms pivoted thereon in the same axial line but at an angle to each other, load-supporting means articulated to said crank-arms, sliding connections between said means and the rocking beam, and a counterpoise connected to said beam.

In witness whereof I have hereunto set my hand in the presence of two witnesses.

CHARLES PROSPER EUGÈNE SCHNEIDER.

Witnesses:
 EDMOND BLAIS,
 PAUL LOUNIRETT.